April 13, 1948. C. T. DAVENPORT 2,439,418
GYROSCOPE STABILIZING MECHANISM
Filed July 27, 1944
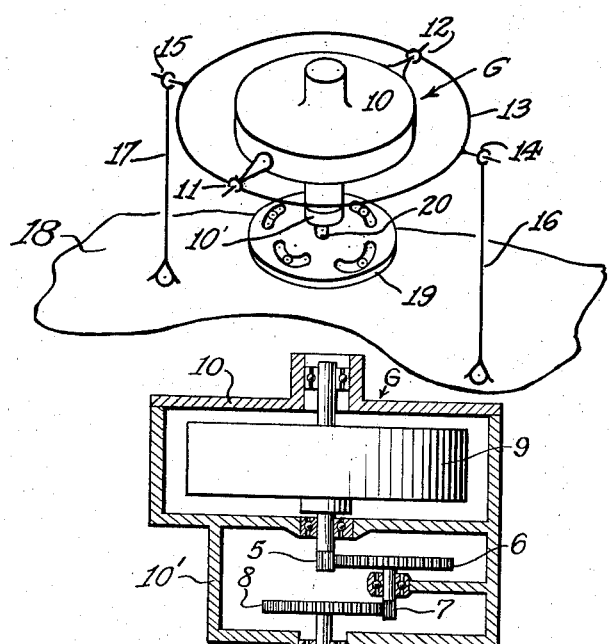
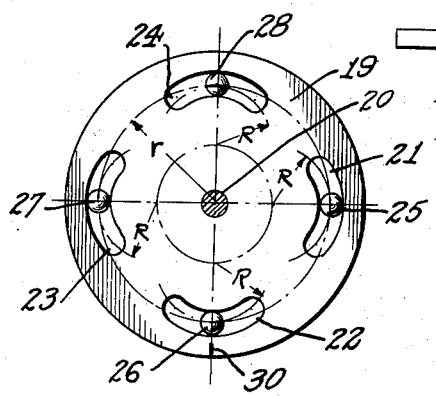
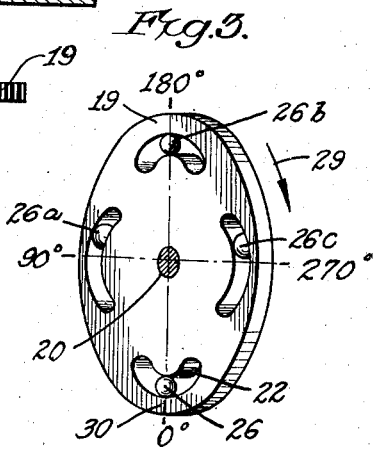
INVENTOR.
CHARLES T. DAVENPORT
BY
Hoguet, Neary & Campbell
ATTORNEYS Patented Apr. 13, 1948

2,439,418

UNITED STATES PATENT OFFICE 2,439,418

GYROSCOPE STABILIZING MECHANISM

Charles T. Davenport, Brooklyn, N. Y., assignor to Arma Corporation, Brooklyn, N. Y., a corporation of New York Application July 27, 1944, Serial No. 546,894

6 Claims. (Cl. 74—5)

This invention relates to stabilizing mechanism for gyroscopes, and has particular reference to self-erecting mechanism for gyro verticals used on unstable platforms, such as aircraft and ships, although the invention is not limited to that use.

The friction in the bearings of the gimbal suspension of a gyroscope invariably produces sufficient resistance to free movement to cause the gyroscope to precess slowly until the gyroscope points in an unpredictable direction, thus rendering it unreliable as to fixed datum point, such as a vertical or zenith indicator. In order to counteract this effect, connected mercury tank ballistic systems are often used to introduce an erecting couple ninety degrees from the plane of the disturbing force. Mercury tank erecting systems are critical and slow in operation, require special metals and sealing to preclude deterioration and consequent impairment of the effectiveness of the mercury, and are otherwise generally unsatisfactory. Another gravity erecting system eliminating some of the objections to mercury tank ballistic systems is the ball type gravitational systems of which several examples are illustrated in U. S. Patent No. 1,311,768, issued July 29, 1919, to J. and J. G. Gray. However, the balls must be positively driven at a constant critical low speed difficult to attain, and subsidiary disturbing forces are introduced by the balls themselves during extreme tilts of the gyroscope, so that such systems frequently cause the gyroscope to indicate a false vertical which is difficult to detect.

In accordance with the present invention, a gravitational erecting system for vertical type gyroscopes is provided which eliminates the objections to prior types and which is extremely simple in construction and operation, as well as direct and rapid in its function of introducing a counter precession to correct all disturbances, to the end that vertical or zenith indicating gyroscopes embodying the system of this invention are true and constant in their indication.

The invention consists in balls rolling in equally-spaced circularly-arranged grooves, each having a curvature of less radius than the radius of rotation of the corresponding balls about the axis of the gyroscope around which they are driven at relatively low speed in a normally horizontal plane. The resulting synchronous oscillation of the balls in their respective grooves in response to a disturbance creates an erecting couple at right angles to the disturbing force, which quickly and accurately rights the gyroscope without causing excessive coning or overshooting of the axis about the true vertical.

For a more complete understanding of the invention, reference may be had to the accompanying drawings, in which:

Figure 1 is a simplified perspective view of a vertical or zenith indicating gyroscope fitted with the stabilizing or tilt-correcting system of this invention;

Fig. 2 is a plan view of the tilt-correcting element of the system of Fig. 1;

Fig. 3 is a view of the tilt-correcting element show in tilted position to illustrate its correcting operation, and Fig. 4 is an axial section through the apparatus of Fig. 1 showing the reduction gear drive of the tilt-correcting element.

Referring to Fig. 1 of the drawings, G designates a gyroscope having an electrically-driven or air-spun rotor, indicated at 9 in Fig. 4, journaled about a normally vertical axis within casing 10, which is mounted in a Cardan suspension for angular movement about two mutually perpendicular axes normally lying in a horizontal plane, so that the gyroscope has three degrees of freedom. The Cardan suspension of the casing 10 includes opposite free bearings 11 and 12 in the gimbal ring 13, which in turn is supported in opposite free bearings 14 and 15 at right angles to bearings 11 and 12 and mounted on posts 16 and 17 fixed firmly on the surface 18 which is the tilting or unstable platform on a ship, airplane, or the like. Theoretically, the gyroscope is unaffected by this suspension, but the friction in the bearings 11, 12, 14 and 15, although small, is nevertheless sufficient to introduce disturbing forces causing the gyroscope axis to wander from true vertical. The present invention not only corrects this condition, but provides an efficient stabilizing system operating by synchronous oscillation of balls rather than by the simple rolling of balls, as in the prior art.

The stabilizing system of this invention includes a normally horizontal disc 19 mounted at the bottom of the gyroscope casing 10 on a short shaft 20 coincident with the spin axis and driven by the gyroscope rotor through conventional reducing gearing housed within extension 10' of the casing 10, so that the disc 19 rotates in the same direction but at a much lower rate of speed than the rotor. The reducing gearing drive of disc 19 is shown in Fig. 4 and comprises a pinion 5 on the lower end of the shaft of rotor 9, meshing with a large gear 6 whose connected pinion 7 meshes with large gear 8 on shaft 20 which supports and rotates disc 19.

The disc 19, shown in enlarged plan view in Fig. 2, is provided at regularly spaced intervals, such as 90°, with relatively short curved or crescent-shaped grooves 21, 22, 23 and 24, each spaced from the center of shaft 20 an equal radial distance $r$, and each having a curvature equal to R, which is considerably less than the radius $r$. The length, spacing, radial distance $r$, and curvature R of the grooves 21—24 depend on the design and requirements of the gyroscope G, and for special purposes the grooves may be non-circular, such as elliptical, for example.

Positioned for rolling movement in grooves 21—24 are corresponding balls 25—28, respectively, each having equal, considerable mass. Each ball is accordingly free to roll back and forth in its corresponding groove under the influence of gravity and of centrifugal force also.

During operation of the stabilizing system of this invention, the disc 19 is driven at constant relatively low speed by supporting shaft 20 around the axis of the latter in a normally horizontal plane and, although the disc 19 is thus positively driven, the balls 25—28 are not, being free to roll back and forth in their grooves, as described. When the disc 19 is horizontal, the balls 25—28 are kept by centrifugal force at their outermost radial points, which are on the radii passing through their median points as shown. However, as soon as the gyroscope 10 tilts, due to some disturbing force, the disc 19 also tilts and the balls 25—28 are subjected to gravity as well as to centrifugal force. Accordingly, the balls begin to change their relative positions according to their location, at any point in their bodily rotation about the center of shaft 20.

The condition occurring upon tilting of the disc 19 to the left is shown in Fig. 3, assuming the plane of the drawing to be horizontal. The disc 19 is being rotated in the direction of the arrow 29. An index mark is shown on the disc at 30 and various angular positions are marked with reference to the mark 30, as 0°, 90°, 180°, and 270°. At the instant illustrated, the index 30 is at the position 0° which is 90° counterclockwise from the lowermost point of the indicated tilt. Now, inasmuch as rotation is occurring in the direction of the arrow 29, the groove 22 will be proceeding clockwise down the incline to the point marked 90°. As this occurs, the corresponding ball 26, which has been held by centrifugal force out on the disc radius $r$ comes progressively under the influence of gravity which causes it to roll clockwise against the restraint of centrifugal force, to the position 26a. As the rotation proceeds to the point marked 180°, the influence of gravity, together with the constant centrifugal force tends to bring the ball back to the center of the groove on the radius of the disc, at 26b. Rotation proceeding to the point marked 270°, the force of gravity again opposes the centrifugal force, causing the ball to move to 26c. Finally, when the disc has made one complete turn and returns to the point marked 0°, gravity, acting with the centrifugal force, restores the ball to the center of the groove, at 26. Considering all four balls in their four respective grooves, it is evident that a shift in the center of gravity of the disc 19 takes place, which is towards 180° when tilted as in Fig. 3.

It will be observed that due to the combined rotation and tilt of disc 19 during a tilt of the gyroscope G, the balls 25—28 oscillate periodically in the respective grooves 21—24, the organization thus constituting a dynamic harmonic system. It will also be observed that the natural period of oscillation of the balls is the same as the period of rotation of disc 19 regardless of the rate of rotation during a tilt of the disc and that the phase of ball oscillation is approximately 90° out of phase with the disturbance cause. Consequently, the system of this invention acts to rapidly neutralize any tilt of the gyroscope G, by applying a righting couple in a vertical plane 90° to the tilt plane. Thus, under any condition of gyroscope tilt the balls immediately assume a corresponding but complex pattern of oscillation in their corresponding grooves to exert the proper righting couple without overshooting because of the short radius R of their oscillating limit, i. e., the grooves, combined with the action of centrifugal force due to disc rotation. Hence, although adjacent balls move in opposite directions during a tilt, as depicted in Fig. 3, the net effect is to unbalance the gyroscope G 90° to the precession or tilt, thereby causing the tilt to disappear at once. In most instances, two or more symmetrically arranged grooves and balls will be used, but in some cases one groove and ball will serve the purpose.

Although a preferred embodiment of the invention has been illustrated and described herein, it is to be understood that the invention is not limited thereby, but is susceptible of changes in form and detail within the scope of the appended claims.

I claim:

1. An harmonic stabilizing system for vertical axis gyroscopes, comprising at least one eccentric guide displaced from and lying in a plane normal to the gyroscope axis with its center portion displaced further from said axis than its end portions, means for uniformly rotating said guide bodily about said axis in said plane, and a mass normally positioned by centrifugal force in the center portion of said guide, said guide having substantially parallel walls defining a path therebetween of sufficient width to accommodate said mass and to permit synchronous oscillation of said mass to either side of the guide along said path in response to the centrifugal force and gravity during a tilt of said gyroscope to create an erecting couple in the righting plane of said gyroscope.

2. An harmonic stabilizing system for vertical axis gyroscopes, comprising at least one curved guide displaced from and lying in a plane normal to the gyroscope axis and whose center of curvature is eccentric to said axis with its center portion displaced further from said axis than its end portions, means for uniformly rotating said guide bodily about said axis in said plane, and a mass normally positioned by centrifugal force in the center portion of said guide, said guide having substantially parallel walls defining a path therebetween of sufficient width to accommodate said mass and to permit synchronous oscillation of said mass to either side of the guide along said path in response to the centrifugal force and gravity during a tilt of said gyroscope to create an erecting couple in the righting plane of said gyroscope.

3. An harmonic stabilizing system for vertical axis gyroscopes, comprising at least one eccentric guide displaced from and lying in a plane normal to the gyroscope axis with its center portion displaced further from said axis than its end portion, means for uniformly rotating said guide bodily about said axis in said plane, and a ball normally positioned by centrifugal force in the center portion of said guide, said guide having substantially parallel walls defining a path therebetween of sufficient width to accommodate said ball and to permit synchronous oscillation of said ball to either side of the guide along said path in response to the centrifugal force and gravity during a tilt of said gyroscope to create an erecting couple in the righting plane of said gyroscope.

4. An harmonic stabilizing system for vertical axis gyroscopes, comprising at least two curved guides symmetrically disposed about and in a plane normal to the gyroscope axis and whose centers of curvature lie in said plane between the corresponding guide and said axis, means for uniformly rotating said guides bodily about said axis in said plane, and a ball normally positioned by centrifugal force in the center portion of each of said guides, each of said guides having substantially parallel walls defining a path therebetween of sufficient width to accommodate a ball and to permit synchronous oscillation of the ball to either side of the guide along said path in response to the centrifugal force and gravity during a tilt of said gyroscope to create an erecting couple in the righting plane of said gyroscope.

5. An harmonic stabilizing system for vertical axis gyroscopes, comprising a member carried by said gyroscope and rotated about and in a plane normal to the gyroscope axis, guides in said member having a curvature in a plane normal to and symmetrically arranged about said axis, the centers of curvature of said guides lying in said plane between the corresponding guide and said axis, whereby the ends of said guides curve inwardly toward said axis, and a mass in each of said guides and urged to the point therein most remote from said axis by the centrifugal force of said rotation, each of said guides having substantially parallel walls defining a path therebetween of sufficient width to accommodate the mass contained therein and to permit synchronous oscillation of said mass to either side of the guide along said path in response to gravity during a tilt of said gyroscope to exert an erecting couple thereon in a vertical plane substantially 90° from the vertical plane of said tilt.

6. An harmonic stabilizing system for vertical axis gyroscopes, comprising a member carried by said gyroscope and rotated about and in a plane normal to the gyroscope axis, cavities in said member having a curvature in a plane normal to and symmetrically arranged about said axis, the centers of curvature of said cavities lying in said plane between the corresponding cavity and said axis, whereby the curvature of each cavity is less than the curvature of the periphery of said member, and a ball in each of said cavities and urged to the point therein most remote from said axis by the centrifugal force of said rotation, each of said cavities having substantially parallel walls defining a path therebetween of sufficient width to accommodate a ball and to permit synchronous oscillation of the ball to either side of the guide along said path in response to gravity during a tilt of said gyroscope to exert an erecting couple thereon in a vertical plane substantially 90° from the vertical plane of said tilt.

CHARLES T. DAVENPORT.

REFERENCES CITED

The following references are of record in the file of this patent:

UNITED STATES PATENTS

| Number | Name | Date |
|---|---|---|
| 1,311,768 | Gray | July 29, 1919 |
| 1,524,709 | Gray | Feb. 3, 1925 |

FOREIGN PATENTS

| Number | Country | Date |
|---|---|---|
| 130,697 | Great Britain | Aug. 14, 1919 |
| 132,944 | Great Britain | Oct. 2, 1919 |
| 318,084 | Italy | June 2, 1934 |